United States Patent
Versteeg et al.

(10) Patent No.: US 9,582,399 B2
(45) Date of Patent: Feb. 28, 2017

(54) ENTROPY WEIGHTED MESSAGE MATCHING FOR OPAQUE SERVICE VIRTUALIZATION

(71) Applicant: CA, INC., Islandia, NY (US)

(72) Inventors: Steven Cornelis Versteeg, Hawthorn (AU); John Sinclair Bird, Ringwood North (AU); Nathan Allin Hastings, Glen Iris (AU); Miao Du, Mitcham (AU); Jean-David Dahan, Cedar Park, TX (US)

(73) Assignee: CA, Inc., New York, NY (US)

( * ) Notice: Subject to any disclaimer, the term of this patent is extended or adjusted under 35 U.S.C. 154(b) by 46 days.

(21) Appl. No.: 14/211,933

(22) Filed: Mar. 14, 2014

(65) Prior Publication Data

US 2015/0261655 A1    Sep. 17, 2015

(51) Int. Cl.
| | |
|---|---|
| *G06F 9/45* | (2006.01) |
| *G06F 11/36* | (2006.01) |
| *G06F 9/455* | (2006.01) |
| *G06F 11/30* | (2006.01) |
| *H04L 12/26* | (2006.01) |
| *H04W 24/06* | (2009.01) |

(Continued)

(52) U.S. Cl.
CPC ...... *G06F 11/3664* (2013.01); *G06F 9/45504* (2013.01); *G06F 11/30* (2013.01); *H04L 43/00* (2013.01); *G06F 9/546* (2013.01); *G06F 11/3672* (2013.01); *H04L 41/5038* (2013.01); *H04L 67/2861* (2013.01); *H04W 24/06* (2013.01)

(58) Field of Classification Search
CPC ............ H04L 41/5038; H04L 67/2861; G06F 11/3672; G06F 11/3664; G06F 9/546; H04W 24/06; G01R 31/31917
See application file for complete search history.

(56) References Cited

U.S. PATENT DOCUMENTS 5,818,851 A * 10/1998 Memmler ............... G04R 20/12
368/47
2002/0168966 A1* 11/2002 Tillier ..................... H04L 67/34
455/412.1

(Continued)

OTHER PUBLICATIONS

Miao Du et al., From Network Traces to System Responses: Opaquely Emulating Software Services, 2015, retrieved online on Oct. 8, 2016, pp. 1-12. Retrieved from the Internet: <URL: https://arxiv.org/pdf/1510.01421v2.pdf>.*

(Continued)

*Primary Examiner* — Thuy Dao
*Assistant Examiner* — Hanh T Bui
(74) *Attorney, Agent, or Firm* — Myers Bigel, P.A.

(57) ABSTRACT

In a service emulation method, a transaction library storing a plurality of messages communicated between a system under test and a target system upon which the system under test depends is accessed responsive to receiving a request from the system under test. One of the messages stored in the transaction library is identified as corresponding to the received request based on different weightings assigned to respective sections of the messages, and a response to the received request is generated using the one of the messages that was identified. Related systems and computer program products are also discussed.

16 Claims, 8 Drawing Sheets

(51) Int. Cl.
*H04L 12/24* (2006.01)
*H04L 29/08* (2006.01)
*G06F 9/54* (2006.01)

(56) References Cited

U.S. PATENT DOCUMENTS

| | | | | | |
|---|---|---|---|---|---|
| 2008/0216059 | A1* | 9/2008 | Moudgal | ........... | H04L 67/02 717/134 |
| 2011/0161063 | A1* | 6/2011 | Pye | ........... | G06F 11/3664 703/13 |
| 2013/0339931 | A1* | 12/2013 | Rode | ........... | G06F 11/34 717/128 |
| 2015/0261655 | A1* | 9/2015 | Versteeg | ........... | G06F 11/3664 717/134 |
| 2015/0268975 | A1* | 9/2015 | Du | ........... | G06F 9/455 703/23 |
| 2015/0363214 | A1* | 12/2015 | Du | ........... | G06F 11/3664 703/23 |
| 2016/0028854 | A1* | 1/2016 | Leeb | ........... | H04L 67/10 709/203 |

OTHER PUBLICATIONS

Michael Bendersky et al., Learning Concept Importance Using a Weighted Dependence Model, ACM, 2010, retrieved online on Oct. 8, 2016, pp. 31-40. Retrieved from the Internet: <URL: http://delivery.acm.org/10.1145/1720000/1718492/p31-bendersky.pdf?>.*

Du et al.; "Generating Service Models by Trace Subsequence Substitution"; QoSA'13, Jun. 17-21, 2013, Vancouver, BC, Canada, Copyright 2013 ACM 978-1-4503-2126-6/13/06; 10 pages.

* cited by examiner

FIG. 6

| byte index | 0 | 1 | 2 | 3 | 4 | 5 | 6 | 7 | 8 | 9 | 10 |
|---|---|---|---|---|---|---|---|---|---|---|---|
| message 1 | 0 | R | V | e | r | s | t | e | e | g | Z |
| message 2 | 1 | D | V | e | r | s | t | e | e | g | Z |
| message 3 | 2 | R | B | i | r | d | Z | | | | |
| message 4 | 3 | R | H | a | s | t | I | n | g | s | Z |
| message 5 | 4 | R | D | u | Z | | | | | | |
| message 6 | 5 | D | D | u | Z | | | | | | |
| message 7 | 6 | R | S | m | i | t | h | Z | | | |

FIG. 7

| byte index | 0 | 1 | 2 | 3 | 4 | 5 | 6 | 7 | 8 | 9 | 10 |
|---|---|---|---|---|---|---|---|---|---|---|---|
| message 1 | 0 | R | V | e | r | s | t | e | e | g | Z |
| message 2 | 1 | D | V | e | r | s | t | e | e | g | Z |
| message 3 | 2 | R | B | i | r | d | | | | | Z |
| message 4 | 3 | R | H | a | s | t | I | n | g | s | Z |
| message 5 | 4 | R | D | u | | | | | | | Z |
| message 6 | 5 | D | D | u | | | | | | | Z |
| message 7 | 6 | R | S | m | | | i | t | h | | Z |

ENTROPY WEIGHTED MESSAGE MATCHING FOR OPAQUE SERVICE VIRTUALIZATION

BACKGROUND

Various embodiments described herein relate to computer systems, methods and program products and, more particularly, to virtualized computer systems, methods and computer program products.

Modern enterprise software environments may integrate a large number of software systems to facilitate complex business processes. Many of these software systems may interact with services provided by other systems in order to fulfill their responsibilities, and thus, can be referred to as "systems of systems." For example, some enterprise-grade identity management suites may support management and provisioning of users, identities, and roles in large organizations across a spectrum of different endpoint systems. Such systems can be deployed into large corporations, such as banks and telecommunications providers, who may use it to manage the digital identities of personnel and to control access of their vast and distributed computational resources and services.

Assuring the quality of such software systems before deployment into actual production environments (i.e., "live" deployment) may present challenges, for example, where the systems interoperate across heterogeneous services provided by large scale environments. For example, physical replication and provisioning of a real-world deployment environments can become difficult to effectively manage or even achieve, as recreating the heterogeneity and massive scale of typical production environments (often with thousands of real client and server hardware platforms, suitably configured networks, and appropriately configured software applications for the system under test to communicate with) may be difficult given the resources of a quality assurance (QA) team. Accessing these environments may also may also involve difficulty and/or expense, and the different environment configurations may affect the operational behavior of such software systems. Thus, due to the complex interaction between a software system and its operating environment, traditional standalone-system-oriented testing techniques may be inadequate for quality assurance.

Enterprise software environment emulation may be used as an alternative approach to providing interactive representations of operating environments. Software service emulation or virtualization may refer to emulation of the behavior of specific components in heterogeneous component-based environments or applications, such as API-driven applications, cloud-based applications and/or service-oriented architectures. Service virtualization allows the communication between a client and software service to be virtualized, such that the virtual service can respond to requests from the client system with generated responses. With the behavior of the components or endpoints simulated by a model or "virtual asset" (which stands in for a component by listening for requests and returning an appropriate response), testing and development can proceed without accessing the actual live components. For instance, instead of virtualizing an entire database (and performing all associated test data management as well as setting up the database for every test session), the interaction of an application with the database may be monitored, and the related database behavior may be emulated (e.g., SQL queries that are passed to the database may be monitored, and the associated result sets may be returned, and so forth). For a web service, this might involve listening for extensible markup language (XML) messages over hypertext transfer protocol (HTTP), Java® message service (JMS), or IBM® Web Sphere MQ, then returning another XML message. Thus, the virtual asset's functionality and performance may reflect the functionality/performance of the actual component, and/or may simulate conditions (such as extreme loads or error conditions) to determine how an application or system under test responds under those circumstances.

By modeling the interaction behavior of individual systems in an environment and subsequently simultaneously executing a number of those models, an enterprise software environment emulator can provide an interactive representation of an environment which, from the perspective of an external software system, appears to be a real or actual operating environment. However, such an approach may require considerable manual effort, for example, with respect to creation of the virtual assets to suitably implement endpoint behavior. In particular, such approach may involve manually defining interaction models (including complex sequences of request/response patterns and suitable parameter values), which may require knowledge of the underlying interaction protocol(s) and system behavior(s). Such information may often be unavailable at the required level of detail (if at all), for instance, when third-party, legacy, and/or mainframe systems are involved. Additionally, the large number of components and component interactions in such systems may make manual approaches time-consuming and/or error-prone. Also, due to lack of control over the environment, if an environment changes with new enterprise elements or communication between elements, these manual protocol specifications must be further updated.

BRIEF SUMMARY

According to some embodiments, in a method of service emulation, a request is received from a system under test, and a transaction library storing a plurality of messages communicated between the system under test and a target system for emulation is accessed responsive to receiving the request. One of the messages stored in the transaction library is identified as corresponding to the request based on different weightings assigned to respective sections of the messages, and a response to the request is generated using the one of the messages that was identified. For example, the different weightings may be assigned to the respective sections of the messages based on a relative variability of the respective sections of the messages among the messages stored in the transaction library. The receiving, the accessing, the identifying, and the generating operations may be performed by a processor.

According to further embodiments, a computer system includes a processor and a memory coupled to the processor. The memory includes computer readable program code embodied therein that, when executed by the processor, causes the processor to access a transaction library storing a plurality of messages communicated between a system under test and a target system for emulation responsive to receiving a request from the system under test, identify one of the messages stored in the transaction library as corresponding to the received request based on different weightings assigned to respective sections of the messages, and generate a response to the request using the one of the messages that was identified.

According to still further embodiments, a computer program product includes a computer readable storage medium having computer readable program code embodied in the medium. The computer readable program code includes computer readable code to access a transaction library storing a plurality of messages communicated between a system under test and a target system for emulation responsive to receiving a request from the system under test, computer readable code to identify one of the messages stored in the transaction library as corresponding to the received request based on different weightings assigned to respective sections of the messages, and computer readable code to generate a response to the request using the one of the messages that was identified.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

FIGS. 6-7 are diagrams illustrating example message alignment for service emulation in accordance with some embodiments of the present disclosure.

DETAILED DESCRIPTION

Figure 1:
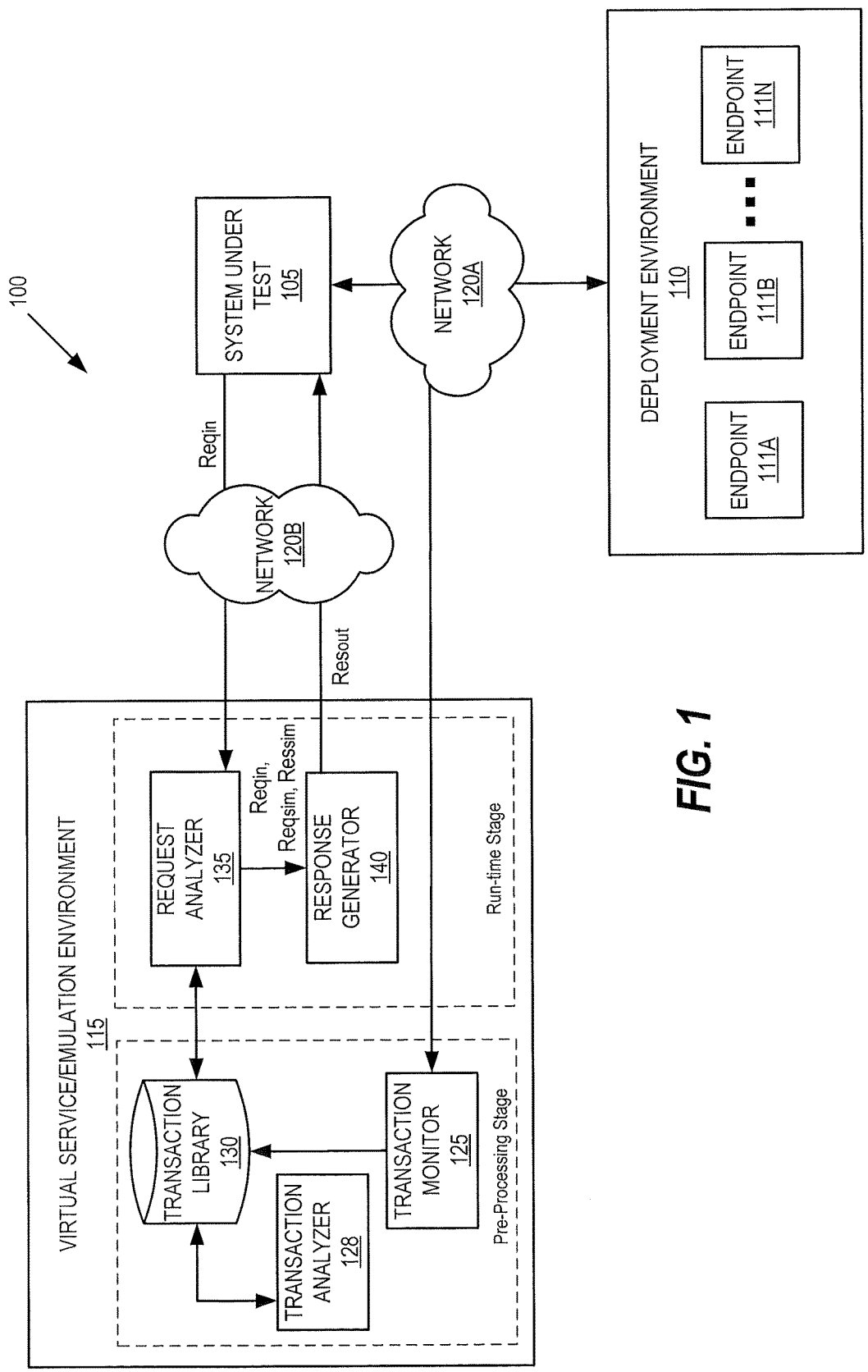
FIG. 1 is a block diagram of a computing system or environment for service emulation in accordance with some embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Further-more, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As described herein, a computing system or environment may include one or more hosts, operating systems, peripherals, and/or applications. Machines in a same computing system or environment may have shared memory or resources, may be associated with the same or different hardware platforms, and/or may be located in the same or different physical locations. Computing systems/environments described herein may refer to a virtualized environment (such as a cloud environment) and/or a physical environment.

Embodiments of the present disclosure may arise from realization that, to assure quality of a system under test (for example, a large enterprise system), physical replication of real-world deployment environments may be difficult or impossible to achieve. Also, while hardware virtualization tools (such as VMWare and VirtualBox) may be capable of replicating specific facets of deployment environments using virtual machines (i.e., software implementations that emulate the architecture and/or program execution of the underlying physical machines), such virtualization tools may have similar scalability limitations as physical recreation of deployment environments (for instance, a virtual CPU-to-physical core ratio on the order of ten to one or less may be required). Mock objects may be used to mitigate some of the scalability concerns, but may be too language-specific and/or may require re-implementation of some of an environment's functionality, which may result in testing environment configuration and maintenance problems and/or may require detailed knowledge of environment components. Performance and load testing tools may allow for emulation of thousands of software system clients with limited resources; however, such tools are typically designed to generate scalable client load towards a target system, rather than the system under test to environment load scaling that is typically helpful in testing enterprise systems.

Figure 12:
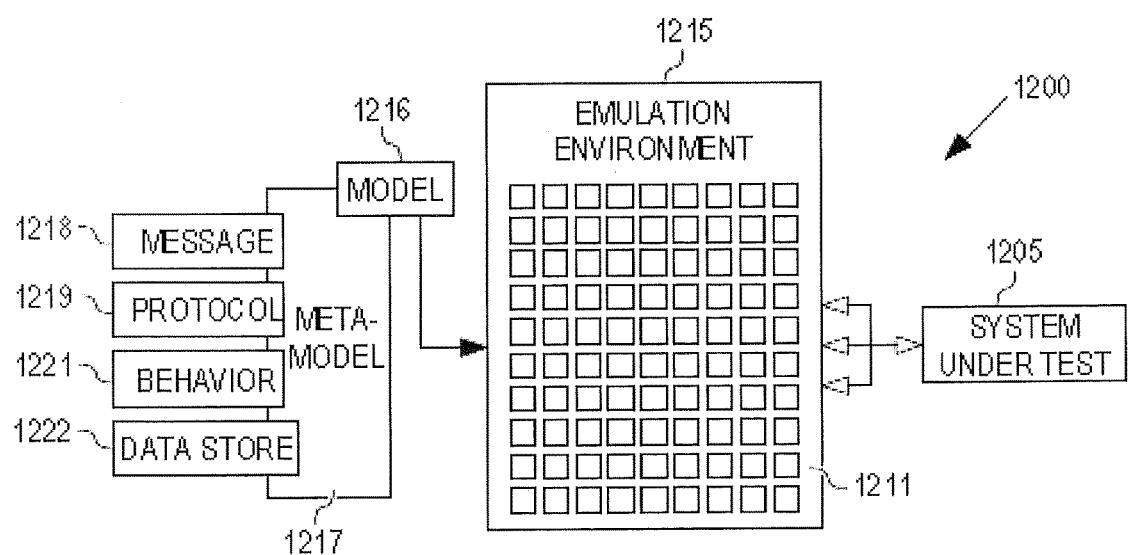
FIG. 12 is a block diagram illustrating an example computing system or environment for service emulation.

As such, emulated or "virtual" deployment environments may be used to provision representations of diverse components, as shown in the environment 1200 of FIG. 12. Such an environment 1200 may allow a system under test 1205 to interact with a large-scale heterogeneous emulation environment 1215, which can be provided by a software environment emulator. The emulation environment 1215 is capable of simultaneously emulating multiple (e.g. on the order of hundreds or thousands) endpoint systems 1211 on one or more physical machines, and may employ scalable models 1216 to allow for scalability and performance testing. The models 1216 may be created from meta models 1217, which may be constructed from messages 1218, protocols 1219, behavior 1221, and/or data store(s) 1222. However, in some instances, scaling of the environment 1215 to handle the number of likely endpoints 1211 in the deployment scenario may require pre-existing knowledge of (i) a likely maximum number of endpoints; (ii) the likely maximum number of messages between endpoint and system; (iii) the likely frequency of message sends/receives needed for the system to respond in acceptable timeframe; (iv) the likely size of message payloads given deployment network latency and bandwidth; and/or (v) the system's robustness in the presence of invalid messages, too-slow response from end-points, or no-response from endpoints. Also, messages being exchanged between the system under test 1205 and the endpoints 1211 should adhere to various protocols; for example, a Lightweight Directory Access Protocol (LDAP) message sent by the system under test 1205 to an endpoint 1211 should be responded to with a suitable response message in reply, in an acceptable timeframe and with acceptable message payload. Subsequent messages sent by the system under test 1205 to the endpoint using the LDAP response message payload may also need to utilize the previous response information. As such, the creation of such executable endpoint models 1211 may require the availability of a precise specification and/or prior detailed knowledge of the interaction protocols 1217 used, may be relatively time consuming and/or error-prone, and may be subject to considerable implementation and/or maintenance effort in heterogeneous deployment environments.

Protocol reverse engineering may be used to determine such interaction protocols 1217. By analyzing a large amount of packets and traces captured on networks, structure information of the target protocol may be obtained for network analysis and even automatically reverse engineering the state-machine model of network protocols. For example, an emulator may be used to mimic client- and/or server-side behaviors. With the emulator, the interactions of web applications may be recorded and replayed to ensure conformance of web server behaviors.

LISA® is a commercial software product which can emulate the behavior of services with which a system under test interacts in its deployment environment, by mimicking responses that an actual service would produce in response to receiving a request from the enterprise system under test. After recording a set of actual interactive message exchanges (including requests and responses; also referred to herein as message transactions) between a system under test and an endpoint, LISA can use the stored interactions to produce responses to further requests, thus behaving as a 'virtual' service. LISA may consider the interaction state when sending a response, and may use field substitution in the responses for fields that are detected as identical in the request and response. However, for the modeling to be effective, LISA may require information regarding the transport protocol and/or the service protocol (or other specification of the message structure) to be known in advance of the recording. In other words, prior knowledge of the service protocol and/or message structure may be required.

Accordingly, some embodiments of the present disclosure are directed to a service emulation or virtualization approach that is configured to deduce or infer enterprise system element interaction behavior (without pre-existing knowledge or agnostic of protocols or message structures) by monitoring and mining message transactions (also referred to as interaction traces) communicated between an endpoint system and elements/components in its deployment environment to automatically build a transaction database or library indicative of client-server and server-server interaction. More particularly, responsive to receiving an incoming request from a system under test, embodiments of the present disclosure (i) search for a suitably similar request in the previously recorded transactions (including requests and responses) stored in the transaction library, (ii) identify commonalities and differences between the incoming request and the previously-recorded requests, and (iii) generate a response based on one(s) of the previously recorded responses associated with the previously recorded request(s) having the identified commonalties and differences. Longest common subsequence matching and field substitution may also be used to implement a distance function and a translation function, respectively, to generate the response to the incoming request.

Various embodiments described herein can provide service emulation or virtualization methods, systems, and/or computer program products that simulate the behavior of a target environment responsive to a request from a system under test, by building a library of previous requests and responses thereto, and generating a response to the received request based on similarities and differences between the received request and the previous requests stored in the library. Such embodiments allow for response generation without pre-existing knowledge of (that is, without receiving, processing, or otherwise independently of data explicitly indicating) a structure and/or protocol associated with the incoming message, and are thus referred to herein as "opaque" service virtualization or emulation.

Some embodiments of the present disclosure may enable synthesis of a protocol definition based on recordation and analysis of actual message transactions, deduction of a corresponding (i.e., similar but not necessarily identical) and/or best-matching response message (and suitable payload) upon receiving a message at an emulated endpoint, and generation of a reply to the sending system under test with the appropriate message and payload synthesized based on the analysis and matching.

In particular embodiments, when an enterprise software system interacts with another system in its deployment environment, observable interaction behaviors, which are referred to herein as interaction traces or message transactions, may be preserved by a network sniffer tool. As a valid interaction typically conforms to a specific protocol specification, the interaction traces may contain precise information, for example, in terms of sequences of request/response patterns, including but not limited to parameter values and potential temporal properties. Embodiments of the present disclosure thereby infer or deduce enterprise system element interaction behaviors for response generation indirectly, through operation on the stored message transactions. While not required, particular embodiments may function by processing interaction traces in order to extract sufficient protocol information therefrom, creating interaction models based on extracted information, and using the created interaction models to communicate with the system under test in the production environment, thereby emulating behavior of the actual systems for quality assurance purposes.

FIG. 1 is a block diagram illustrating a computing system or environment for opaque service emulation in accordance with some embodiments of the present disclosure. Referring now to FIG. 1, the environment 100 includes a system under test 105, a deployment environment 110 including a plurality of endpoints 111A, 111B, . . . 111N, and a virtual service environment (also referred to herein as an emulation environment) 115. The deployment environment 110 may include one or more software services upon which the system under test 105 depends or otherwise interacts to fulfill its responsibilities. The emulation environment 115 includes a transaction monitor 125, a transaction analyzer 128, a request analyzer 135, a response generator 140, and a message transaction library 130. The message transaction library 130 stores a set of message transactions (including requests and associated responses) sampled from prior communications with (i.e., to and/or from) a client (here, the system under test 105) and a target service for emulation or virtualization (here, the deployment environment 110).

The environment 100 of FIG. 1 operates as follows. The system under test 105 is observed communicating with endpoint(s) 111A, 111B, . . . 111N in a deployment environment 110 via a transaction monitor 125, for example, in a pre-processing stage. The transaction monitor 125 may include or implement a network monitoring tool, such as Wireshark®, for monitoring communications between the system under test 105 and the endpoint(s) 111A, 111B, . . . 111N. The system under test 105 and the endpoint(s) 111A, 111B, . . . 111N communicate via a network 120A using a communications mode or protocol, such as Lightweight Directory Access Protocol (LDAP) messages or Simple Object Access Protocol (SOAP) messages, which may be conveyed using Hypertext Transport Protocol (HTTP) with an Extensible Markup Language (XML) serialization. The transaction monitor 125 records message transactions (including requests and responses thereto) communicated with (i.e., to and/or from) the system under test 105, in particular, between the system under test 105 and the endpoint(s) 111A, 111B, . . . 111N, for example, using a network sniffer tool. The transaction monitor 125 stores these message transactions in the transaction library 130. For example, the transaction monitor 125 may store the transactions between the system under test 105 and the endpoint(s) 111A, 111B, . . . 111N in the transaction library 130 as request/response pairs. For a given protocol, a sufficiently large number of interactions between the system under test 105 and the endpoint(s) 111A, 111B, . . . 111N are recorded. The transaction monitor 125 may also be configured to filter network traffic such that messages of interest may be recorded in a suitable format for further processing. In some embodiments, the transaction monitor 125 may be configured to record the message transactions between the system under test 105 and the endpoint(s) 111A, 111B, . . . 111N in the library 130 without knowledge of structural information (which may indicate the protocol, operation type, and/or header information) of the requests/responses. After the transactions have been recorded, the transaction analyzer 128 may be configured to align the messages in the transaction library 130 in a manner suitable for comparison of the relative variability of sections, fields, positions and/or other portions thereof. The transaction library 130 thus provides historical transaction data for the system under test 105, which is used as a source for protocol analysis and response generation as described in greater detail herein.

In the pre-processing stage, operations may also be performed to distinguish protocol information (i.e. message structural information defined by a particular protocol specification) from payload information (i.e. variables that are produced/consumed by application programs) by further analysis of the stored messages in the transaction library 130, which may increase accuracy and efficiency. However, it will be understood that such pre-processing of the message transactions may not be necessary to infer and generate responses in some embodiments. For example, in some embodiments, protocol information may be distinguished from payload information in the run-time stage based on the relative variability of sections of the stored messages (that is, based on the entropy of the sections relative to one another), as described in greater detail below.

Still referring to FIG. 1, when running QA tests against the system under test 105 (i.e., in a run-time stage), the emulation environment 115 may receive a request $Req_{in}$ from the system under test 105 at the request analyzer 135 via a network 120B. The request analyzer 135 is configured to access the transaction history stored in the library 130 to indirectly identify potential valid response messages based on stored requests that match the received request $Req_{in}$, without knowledge or determination of the structure or protocol of the received request $Req_{in}$. For example, the identifying may be performed at run-time without an understanding of the contents of the request, and without pre-processing of the received request $Req_{in}$. In some embodiments, the request analyzer 135 may employ a one or more algorithms, such as a distance function, to compare the current request $Req_{in}$ received from the system under test 105, the previously-stored historical sequences of request/response pairs, and/or other values in the received request. Results of the analysis by the request analyzer 135 (for example, in the form of matching request/response pairs, $Req_{sim}$, $Res_{sim}$) are provided to the response generator 140. It will be understood that, as used herein, a "matching" or "corresponding" message, request, and/or response stored in the transaction library 130, as determined for example by the request analyzer 135, may refer to a message/request/response that is similar (but not necessarily identical) to the request $Req_{in}$ received from the system under test 105.

The response generator 140 is configured to synthesize or otherwise generate a response message $Res_{out}$ based on the results ($Req_{sim}$, $Res_{sim}$) and/or the incoming request $Req_{in}$ using one or more algorithms, such as a translation function, as described in greater detail below. The response generator 140 thereby returns the generated response $Res_{out}$ to the system under test 105, and the system under test 105 consumes or otherwise processes the generated response $Res_{out}$ and continues running. Thus, the response $Res_{out}$ is automatically generated using the received request $Req_{in}$ from the system under test 105 and the matching request/response pairs stored in the transaction library 130, in contrast to some existing emulation approaches, where requests received by the emulation environment may be processed using (typically) manually-specified scripts to generate a response. The automatically generated response $Res_{out}$ is returned to the system under test 105 via the network 120B.

It will be appreciated that in accordance with various embodiments of the present disclosure, the emulation environment 115 may be implemented as a single server, separate servers, or a network of servers (physical and/or virtual), which may be co-located in a server farm or located in different geographic regions. In particular, as shown in the example of FIG. 1, the emulation environment 115 is coupled to the system under test 105 via network 120B. The deployment environment 110 may likewise include a single server, separate servers, or a network of servers (physical and/or virtual), coupled via network 120A to the system under test 105. The networks 120A, 120B may be a global network, such as the Internet or other publicly accessible network. Various elements of the networks 120A, 120B may be interconnected by a wide area network (WAN), a local area network (LAN), an Intranet, and/or other private network, which may not be accessible by the general public. Thus, the communication networks 120A, 120B may represent a combination of public and private networks or a virtual private network (VPN). The networks 120A, 120B may be a wireless network, a wireline network, or may be a combination of both wireless and wireline networks. Although illustrated as separate networks, it will be understood that the networks 120A, 120B may represent a same or common network in some embodiments. As such, one or more of the system under test 105, the deployment environment 110, and the emulation environment 115 may be co-located or remotely located, and communicatively coupled by one or more of the networks 120A and/or 120B. More generally, although FIG. 1 illustrates an example of a computing environment 100, it will be understood that embodiments of the present disclosure are not limited to such a configuration, but are intended to encompass any configuration capable of carrying out the operations described herein.

Figure 2:
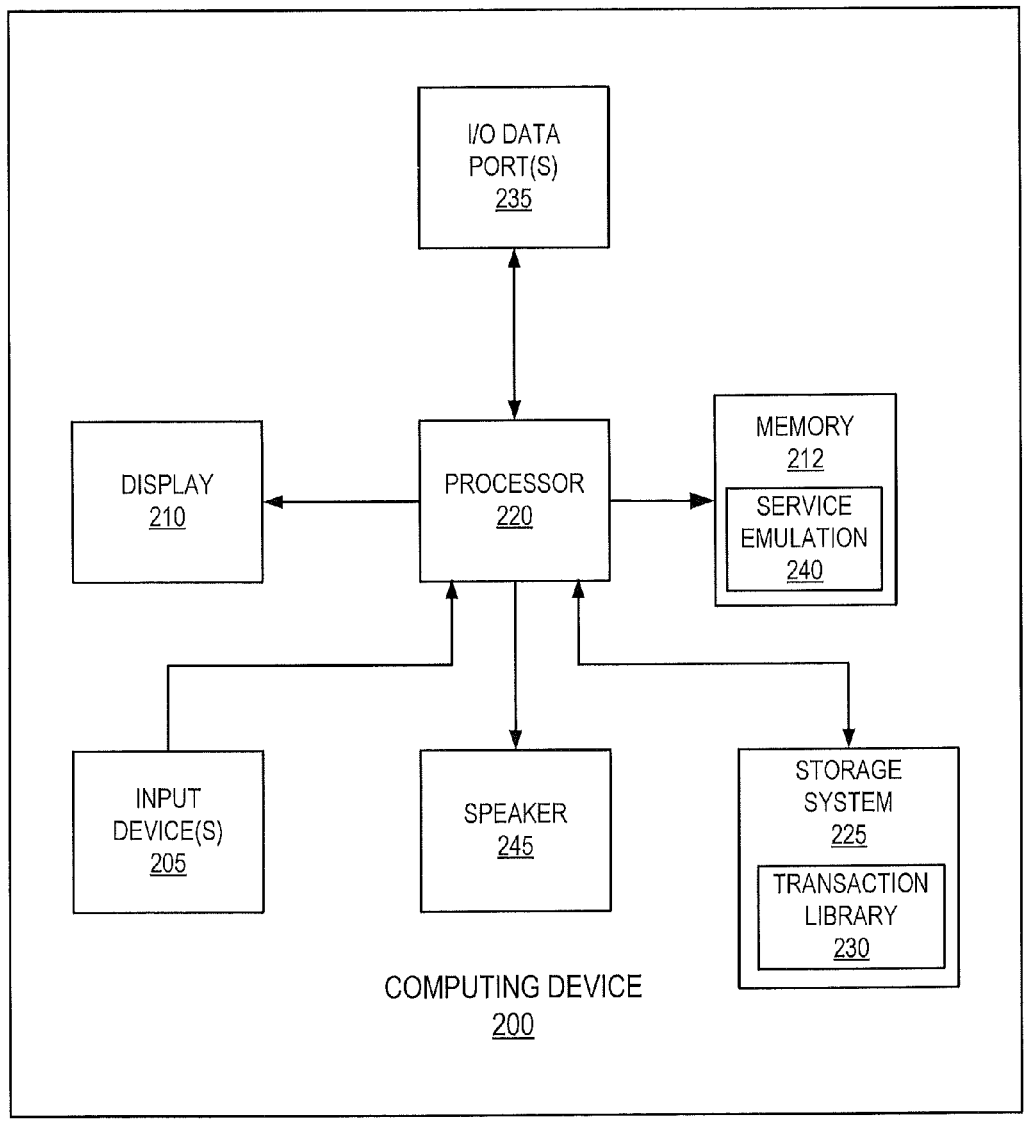
FIG. 2 is a block diagram that illustrates computing device for service emulation in accordance with some embodiments of the present disclosure

FIG. 2 illustrates an example computing device 200 in accordance with some embodiments of the present disclosure. The device 200 may be used, for example, to implement the virtual service environment 115 in the system 100 of FIG. 1 using hardware, software implemented with hardware, firmware, tangible computer-readable storage media having instructions stored thereon, or a combination thereof, and may be implemented in one or more computer systems or other processing systems. The computing device 200 may also be a virtualized instance of a computer. As such, the devices and methods described herein may be embodied in any combination of hardware and software.

As shown in FIG. 2, the computing device 200 may include input device(s) 205, such as a keyboard or keypad, a display 210, and a memory 215 that communicate with one or more processors 220 (generally referred to herein as "a processor"). The computing device 200 may further include a storage system 225, a speaker 245, and I/O data port(s) 235 that also communicate with the processor 220. The memory 212 may include a service emulation module 240 installed thereon. The service emulation module 240 may be configured to mimic the behavior of a target system for emulation in response to a request or other message received from a system under test, as described in greater detail herein.

The storage system 225 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage system 225 may include a transaction library 230 storing data (including but not limited to requests and associated responses) communicated between a system under test and a target system for emulation. Although illustrated in separate blocks, the memory 212 and the storage system 225 may be implemented by a same storage medium in some embodiments. The input/output (I/O) data port(s) 235 may include a communication interface and may be used to transfer information in the form of signals between the computing device 200 and another computer system or a network (e.g., the Internet). The communication interface may include a modem, a network interface (such as an Ethernet card), a communications port, a PCMCIA slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

In communications between two system elements, such as the system under test 105 and the deployment environment 110, both should adhere to a particular protocol specification. It can be inferred that the observable message transactions contain information regarding this protocol specification, also referred to herein as structural information. However, in addition to such structural information, transmitted messages often deliver user data (also known as payloads) that may be consumed/produced by an application using the particular protocol, in order to exchange messages with another application. Message transaction analysis may thus be used by the service emulation module 240 to distinguish protocol-related information (i.e. message format/structure) from application-specific information (i.e. payload) with little or no prior knowledge of the particular protocol used in the message transaction.

In some embodiments, the service emulation module 240 may be configured to pre-process the message transactions stored in the transaction library 230 to investigate widely-used application-layer protocols. Doing so may provide insight into both messages structures and encoding rules of available protocols, thereby obtaining a set of heuristic rules for inference purposes. Specifically, if the stored message transactions inherently conform to a protocol whose message structures and encoding rules have been well defined, the messages may be associated with this particular protocol automatically. If, on the other hand, the stored message transactions do not conform to any known protocols, a relevant rule may be automatically selected and a new heuristic rule set may be composed.

A distance function may be used by the service emulation module 240 to indirectly identify a stored request that corresponds to an incoming request based on a measure of similarity, rather than based on knowledge of the underlying structure of the request(s). One notion of similarity used in some embodiments of the present disclosure is the edit distance between two sequences s1 and s2, which indicates the minimum number of modifications (insertions, deletions, and/or substitutions) in order to obtain s2 from s1. That is, the distance function may be used to compute the number of modifications or alterations to the incoming request required to arrive at the recorded request. In some embodiments, one of a plurality of distance functions may be automatically selected based on a particular notion of similarity and/or a particular protocol. Depending on the distance function selected, a different pre-recorded request may be chosen to be the most "similar" to the incoming request. In some embodiments, the similarity may be calculated using a distance function that is weighted based on different weightings of respective character positions, as discussed in detail below.

A translation function may be used by the service emulation module 240 to generate or synthesize a valid response to a incoming request. The validity of a generated response may depend on the message structure, as the sequence of transmitted messages typically adhere to a particular protocol specification that is used by an application on one host to exchange data with its communicating partner on other host(s) over the network. The validity of the generated response may also depend on the synthesis of payloads that can be recognized, extracted, and/or further processed by its communicating partner. As both the protocol- and the application-related information may be distinguished by the pre-processing and/or distance calculation, the translation function may be configured to automatically structure messages in the expected format and fill in payload contents.

In generating the transaction library in accordance with embodiments of the present disclosure, each request may be assumed to be followed by a single response. If a request does not generate a response, a dedicated "no-response" message may be inserted into the recorded message transactions. Conversely, if a request leads to multiple responses, these may be concatenated into a single response. Such an approach may be used to merge multiple LDAP search result entries into a single response. A number of constructs may be defined to express one or more frameworks used in the transaction library in accordance with some embodiments. In particular, a basic building block, the set of message characters, may be denoted by Equality and inequality may also be defined for the elements of C. In some embodiments, C may include a set of valid bytes that can be transmitted over a network, and/or a set of printable characters as a dedicated subset. Furthermore, 'M' may be defined to include a set of all (possibly) empty messages that can be defined using the message characters. A message m∈M is a non-empty, finite sequence of message characters $c_1 c_2 c_3 \ldots c_n$, with $c_i \in C$; $1 \le i \le n$. Two messages $m1 = c_{1,1} c_{1,2} \ldots c_{1,l}$ and $m2 = c_{2,1} c_{2,2} \ldots c_{2,n}$ may be considered to be equal if l=n and $c_{1,i} = c_{2,I}$, $1 \le i \le n$. A single interaction or transaction I may include a request, denoted by Req, as well as the associated response, denoted by Res. Both Req and Res may be elements of M, and (Req, Res) may denote an associated request/response pair. An interaction trace may be defined as a finite, non-empty sequence of interactions, that is, $I_1 I_2 I_3 \ldots I_n$. Also, the set of interactions I may be defined as a non-empty set of interaction traces.

In processing an incoming, unknown request from a system under test, some embodiments of the present disclosure use an approach where, if the incoming request is similar to one of the recorded requests, then the response should also be similar to a previously recorded response associated with the similar one of the recorded requests. Hence, identifying the differences between the incoming and previously recorded requests may provide an indication how the associated recorded response can be altered in order to synthesize a matching response. For example, some recorded interaction traces between an LDAP client and server may contain a search request for all entries with the name "Baker." If an incoming request defines a search for all entries with the name "Parker," then the two requests can be considered to be similar (as both are search requests; only the name is different). Hence, in generating a search result in response to the request for "Parker", all occurrences of "Baker" in the recorded interaction traces may be replaced with "Parker", and the LDAP message-id may be adjusted accordingly, such that the altered response to the recorded search for "Baker" may be a sufficient response to the search for "Parker" for emulation purposes. Consequently, some embodiments of the present disclosure may include the following processing steps: (i) given an incoming request $Req_{in}$, from a system under test to an emulated enterprise system endpoint, a sufficiently similar request $Req_{sim}$ may be identified among the previously recorded interaction traces stored in the transaction library; and (ii) a response $Res_{out}$ for the incoming request may be synthesized or otherwise generated based on the similarities in the incoming request $Req_{in}$ itself and the similar previously recorded request $Req_{sim}$ identified in the interaction traces, as well as the previously recorded response $Req_{sim}$ associated with the similar request.

Using the definitions discussed above, where $Req_{in}$ refers to the incoming request and $I^*(I)$ refers to a set of all interactions in I, a framework may be denoted as:

$Res_{out}=trans(Req_{in}, Req_{sim}, Res_{sim})$, with $(Req_{sim}, Res_{sim}) \in I^*(I)$; and $\forall (Req_i, Res_i): dist(Req_{in}, Req_{sim}) \leq dist(Req_{in}, Req_i)$, where 'dist' and 'trans' may denote user-defined distance and translation functions, respectively, allowing the framework to be tailored for the specific needs of given context. The distance function 'dist' may be used to compute the distance between two requests. In particular, embodiments, (i) the distance of a message m with itself may be defined to be zero, that is dist(m,m)=0, and (ii) the distance between two non-identical messages m1 and m2 may be defined to be greater than zero. Depending on the type of distance function used, a different pre-recorded request may be determined to be corresponding to and/or the most similar (also described herein as a closest matching request) to the incoming request. The translation function 'trans' may be used to synthesize a response $Res_{out}$ to the incoming request $Req_{in}$, for instance, by substituting some parts of $Res_{sim}$. In some embodiments, temporal properties in the framework may be disregarded, that is, the synthesized response may depend on the incoming request and the recorded interaction traces, but not on previously received or transmitted requests or responses. However, in other embodiments, temporal or historical data regarding incoming requests and generated responses may be used in the generation of future responses.

To determine the "similarity" between the incoming request and the recorded interaction traces/message transactions, one or more distance measures may be used. One such measure is the edit distance between two sequences s1 and s2, indicating the minimum number of modifications (insertions, deletions, and/or substitutions) in order to obtain s2 from s1. Such a measure has also been used in the area of bioinformatics in order to determine similarities in the amino acid sequences of proteins, and is known as the Needleman-Wunsch algorithm. In particular, sequence alignment may be used to align all common subsequences of two sequences under comparison, and to insert gaps into either of the sequences when they differ, as also discussed below with reference to FIG. 7. In order to avoid random alignments of a small size, the algorithm may be modified in such a way that a minimum length may be required in order to identify common subsequences as such. In addition, the algorithm may be weighted based on different weightings assigned to respective character positions of the sequences under comparison.

The following illustrates an example of message alignment in accordance with some embodiments described herein. Consider the following two text sequences:
Where is my computer book?
Where is your computer magazine?
The common subsequences are "Where is", "computer", and "?", while "my" versus "your" and "book" versus "magazine" are the two differing parts of the two sequences. The standard Needleman-Wunsch algorithm would align the character 'y' common to "my" and "your", although it probably makes more sense not to identify 'y' as a common subsequence, hence the use of a minimum length of common subsequence.

Under the modified alignment algorithm, the fully aligned sequences will be as follows (where the character "*" denotes an inserted gap):
Where is my** computer book*****?
Where is  your computer **magazine?
The distance between these two example text sequences may be defined by the number of gaps inserted to both sequences in the alignment process (18 gaps in the example above). In order to allow for a better comparison of similarity across multiple protocols and/or scenarios, the dissimilarity ratio may be defined as the ratio of the "raw" edit distance divided by the length (i.e. number of elements/character positions) of both sequences, e.g., 18/(26+32)=0:31 in the example given above. The dissimilarity ratio, as illustrated in this example, was used as the distance measure for the evaluation results discussed below, where two identical sequences will have a dissimilarity ratio of 0, and the greater the ratio, the greater the dissimilarity of the two sequences. The dissimilarity ratio, edit distance, or other distance measure may also be computed based on different weightings assigned to respective message sections, fields, character positions, byte positions, and/or n-grams, for example, based on a relative diversity thereof, as discussed in detail below.

To generate or synthesize a response for the incoming request, the commonalities between the incoming request, its best match among the recorded requests and the associated recorded response may be exploited. In some embodiments, common subsequence identification may again be relied upon. In particular, it is noted that many protocols encode information in request messages that are subsequently used in associated responses. For example, application-level protocols such as LDAP add a unique message identifier to each request message, where the associated response message should also contain the same message identifier in order to be seen as a valid response. Therefore, to synthesize responses for LDAP (or similar protocols) in accordance with some embodiment of the present disclosure, the message-id from the incoming request may be copied into the associated one of the recorded response messages. Similarly, information associated with a specific request operation (e.g., a search pattern for a search request) may be "copied" across from the request to its response. Such information is referred to herein as symmetric fields, and the copying of such information from an incoming request in generating a response is referred to herein as symmetric field substitution.

The common subsequence algorithm described above may be used to identify symmetric fields, that is, the common subsequences between a request and its associated response. However, as the symmetric fields may not appear in the same order and/or cardinality, simple sequence alignment may be problematic. Instead, an alignment matrix may be used to identify common subsequences. In order to avoid small and/or random common subsequences, a threshold sequence length (based on a number/amount of characters) may be defined as to when a common sequence of characters is considered a symmetric field. Once the symmetric fields between $Req_{sim}$ and $Res_{sim}$ are determined, the corresponding field information may be identified in the incoming request $Req_{in}$ and substituted in $Res_{sim}$ in order to synthesize the final response $Res_{out}$.

The following example illustrates the identification of symmetric fields and how symmetric fields are used in the response generation process in accordance with some embodiments of the present disclosure. Consider the following incoming LDAP search request:

Message ID: 18
    ProtocolOp: searchRequest
    ObjectName: cn=Mal BAIL, ou=Administration,
        ou=Corporate, o=DEMOCORP, c=AU
    Scope: 0 (baseObject)

In generating a response to the above request, a search for the most similar/closest matching request among the recorded interaction traces stored in the transaction library is performed using the distance function, and may return the following recorded request:

Message ID: 37
    ProtocolOp: searchRequest
    ObjectName: cn=Miao DU, ou=Administration,
        ou=Corporate, o=DEMOCORP, c=AU
    Scope: 0 (baseObject), which is paired with the following recorded response:

Message ID: 37
    ProtocolOp: searchResEntry
    ObjectName: cn=Miao DU, ou=Administration,
        ou=Corporate, o=DEMOCORP, c=AU
    Scope: 0 (baseObject)
    Message ID: 37
    ProtocolOp: searchResDone
    resultCode: success Symmetric field identification as described herein results in two substrings that are identical across request and response:

Message ID: 37
    ProtocolOp:
and
    ObjectName: cn=Miao DU, ou=Administration,
        ou=Corporate, o=DEMOCORP, c=AU
    Scope: 0 (baseObject)

By substituting the corresponding values from the incoming request, the following response is generating in accordance with some embodiments of the present disclosure:

Message ID: 18
    ProtocolOp: searchResEntry
    ObjectName: cn=Mal BAIL, ou=Administration,
        ou=Corporate, o=DEMOCORP, c=AU
    Scope: 0 (baseObject)
    Message ID: 18
    ProtocolOp: searchResDone
    resultCode: success Accordingly, some embodiments of the present disclosure provide service emulation or virtualization methods that do not require explicit or pre-existing knowledge of the underlying structural information (which may indicate the protocol, operation type, and/or header information) of messages. Rather, such methods may generate responses indirectly or "opaquely" by using a received request and a distance function to find or identify the closest matching request in a transaction library, and may then return the associated response from the transaction library, as modified with symmetric field substitution from the received request.

Opaque message matching in accordance with embodiments of the present disclosure thus allows a service or system to be virtualized without (or otherwise independent of) data explicitly indicating the service protocol message structure and/or service operation types. In particular embodiments, the Needleman-Wunsch sequence matching algorithm may be used to match message requests as a series of bytes for service virtualization, thereby requiring no knowledge of the message protocol or other structural information.

Further embodiments of the present disclosure may arise from realization that opaque response generation may, in some instances, have relatively low accuracy. In particular, while a message typically contains header information, operation type information, and record (e.g. customer) information, the operation type information is typically more significant or relevant for generating a response to a received request. However, as opaque response matching has no pre-existing knowledge of the message structure of the incoming message, all bytes may typically be treated equally, regardless of the section/field/position of the message in which the bytes are included. Because record information (or other payload information) often includes more characters (i.e., is "longer") than operation type information, opaque response generation will often identify a stored message of the "wrong" operation type for the received request (based on closer matching record data), in finding the closest matching request. For example, a "search" response may be returned when the received request was a "modify" request, based on a greater amount of matching data in the record field of the closest matching request.

Accordingly, some embodiments of the present disclosure may further enhance opaque response generation by calculating and assigning different weightings to different sections, fields, positions and/or other portions of the messages during the request-matching distance calculations. In particular, position weightings may be calculated as a function of the diversity or variability (i.e., entropy) of different byte or character positions among the messages stored in the transaction library, because character positions in the header- and operation type-sections/fields of messages (which may be more relevant for generating a response) are typically more stable (i.e., have less variability) than the record information sections/fields of the messages. In other words, the relative variability of portions of a message may be used to infer the type category of information contained in these portions, and the portions may be weighted according to their relative importance to response generation. Weighting message distances as a function of inverse variability in accordance with embodiments of the present disclosure may thereby improve the accuracy of opaque response generation, without explicit knowledge of the message structure.

Figure 3:
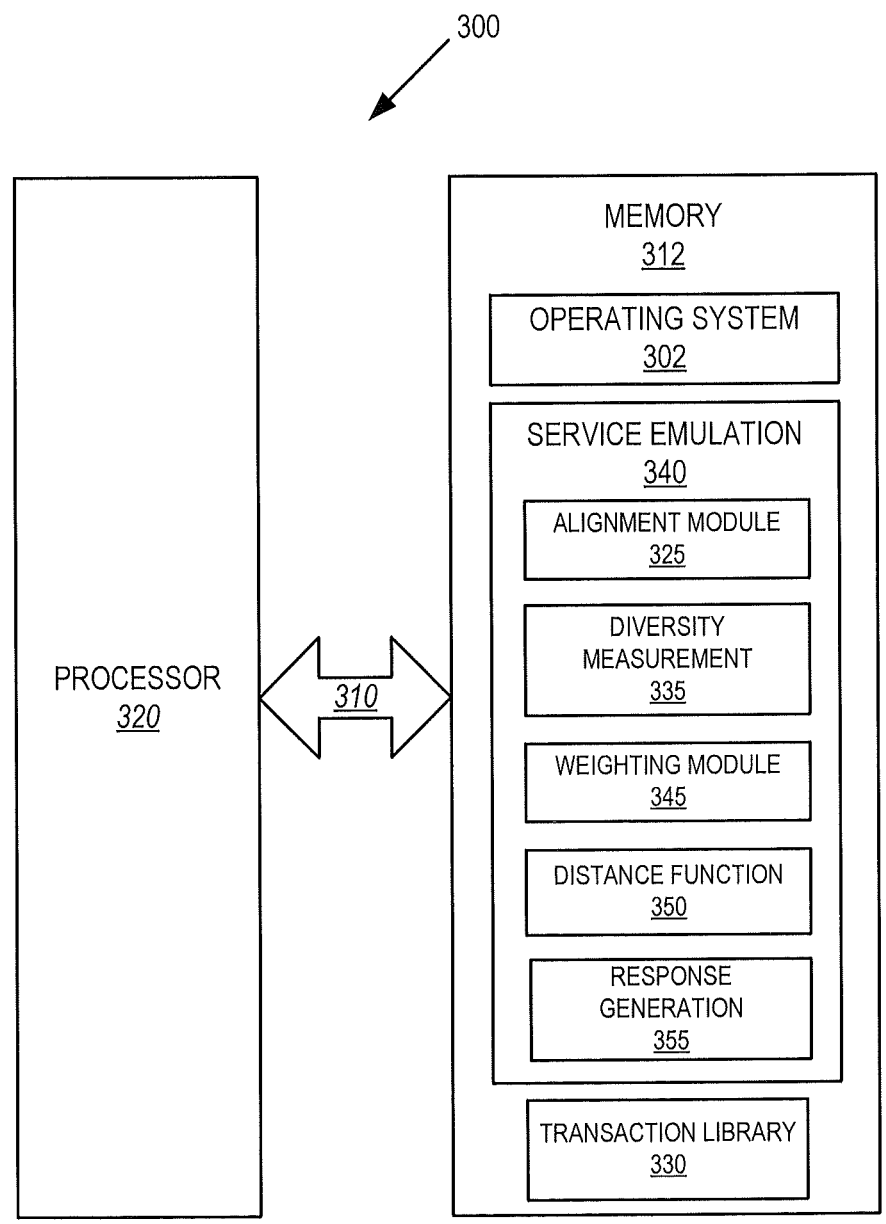
FIG. 3 is a block diagram that illustrates a software/hardware architecture for service emulation in accordance with some embodiments of the present disclosure.

FIG. 3 illustrates a computing system or environment for opaque service emulation using entropy-weighted message matching in accordance with further embodiments of the present disclosure. In particular, FIG. 3 illustrates a processor 320 and memory 312 that may be used in computing devices or other data processing systems, such as the computing device 200 of FIG. 2 and/or the virtual service environment 115 of FIG. 1. The processor 320 communicates with the memory 312 via an address/data bus 310. The processor 320 may be, for example, a commercially available or custom microprocessor, including, but not limited to, digital signal processor (DSP), field programmable gate array (FPGA), application specific integrated circuit (ASIC), and multi-core processors. The memory 312 may be a local storage medium representative of the one or more memory devices containing software and data in accordance with some embodiments of the present invention. The memory 312 may include, but is not limited to, the following types of devices: cache, ROM, PROM, EPROM, EEPROM, flash, SRAM, and DRAM.

As shown in FIG. 3, the memory 312 may contain multiple categories of software and/or data installed therein, including (but not limited to) an operating system block 302 and a service emulation block 340. The operating system 302 generally controls the operation of the computing device or data processing system. In particular, the operating system 302 may manage software and/or hardware resources and may coordinate execution of programs by the processor 320, for example, in providing the service emulation environment 115 of FIG. 1.

The service emulation block 340 is configured to carry out some or all of the functionality of the transaction analyzer 128, the request analyzer 135, and/or the response generator 140 of FIG. 1. In particular, the service emulation block 340 includes an alignment module 325, a diversity measurement module 335, a weighting calculation module 345, a distance function module 350, and a response generation module 355. The message transaction library 330 stores a set of messages or transactions (including requests and associated responses), which are a sample of the communications between a client (such as the system under test 105 of FIG. 1) and a target service for virtualization (such as the deployment environment 110 of FIG. 1).

The alignment module 325 implements one or more alignment methods, such as those described above, to align the messages in the transaction library 330 based on character positions thereof. For instance, the alignment module may be configured to align messages by their byte (or character) indices, as shown in the example of FIG. 6, or by using a multiple sequence alignment algorithm (such as ClustalW), as shown in the example in FIG. 7. However, it will be understood that the alignment module 325 is not limited to these specific alignment methods.

Figure 8:
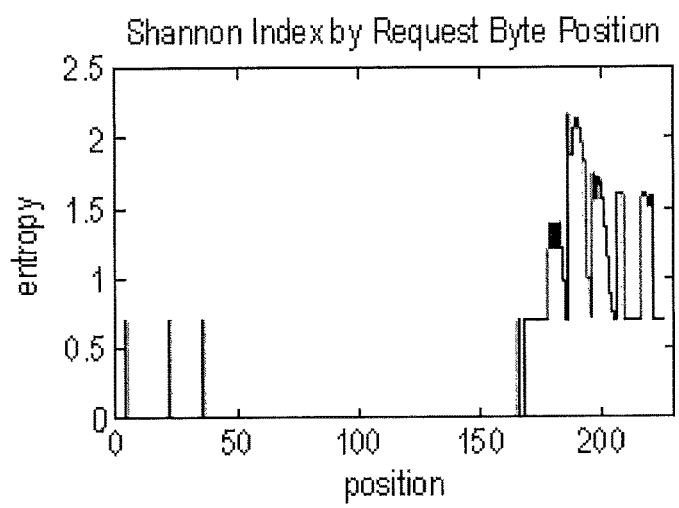
FIGS. 8-10 are graphs illustrating example diversity measurements for service emulation in accordance with some embodiments of the present disclosure.
Figure 9:
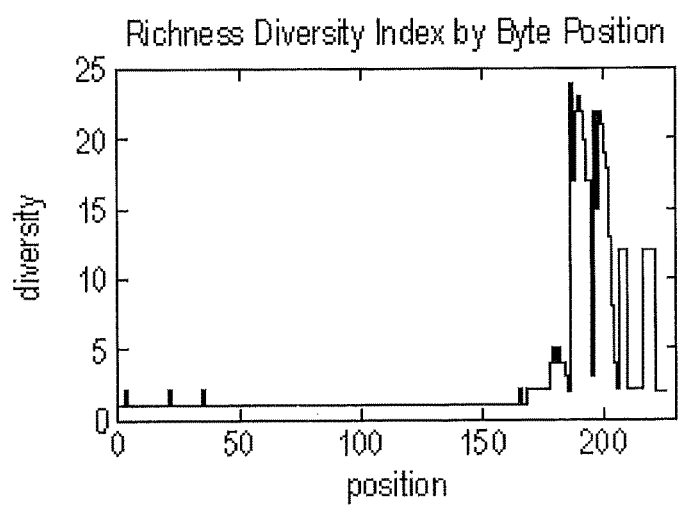

The diversity measurement module 335 applies a diversity measure to the messages stored in the transaction library 330 to quantify the variability of different sections, fields, character positions, byte positions, n-grams, and/or other portions of the messages. For example, variability can be calculated from the number of n-grams which occur at a given message byte position. An n-gram is a sequence of n symbols (e.g. bytes); for instance, the n-grams which occur at position X may be "add", "del", "upd", "get", so the n-gram diversity at position X would be 4. Some example diversity measures may include entropy measures, such as the Shannon Index (quantifying the entropy of the character strings in the stored library; as shown in the example of FIG. 8), richness (a count of the number different of character types in the stored library; as shown in the example of FIG. 9), or the Gini Index (measuring the statistical dispersion among the character strings in the stored library). The diversity measure(s) implemented by the diversity measurement module 335 are not limited to these measures, and other methods for determining the relative variability of respective sections/fields/character positions among the stored messages may also be used. In some embodiments, a diversity index may be calculated for each message section (or even per field or per character position), based on the alignment of the stored messages by the alignment module 325. For the purposes of diversity calculations, gaps between characters (for example, as shown in the example alignment of FIG. 7) may be treated as special symbols, or may even be excluded from the diversity calculation.

Figure 10:
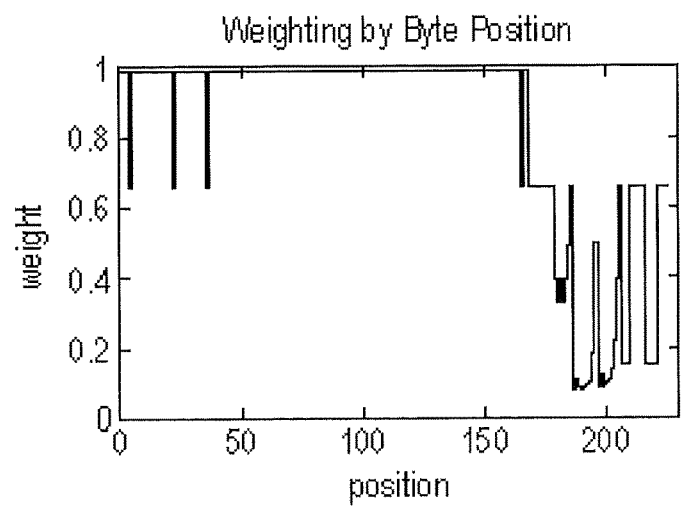

The weighting calculation module 345 implements one or more functions for calculating weightings for respective message sections, fields, and/or character positions based on the diversity measurement from module 335. For example, the weighting calculation module 345 may calculate the respective weightings in proportion to the inverse of the diversity of the byte positions of the stored messages, and/or may include scaling factors that can affect the steepness of how changes in diversity impact the weightings. An example weighting function is:

$$W[x]=A/(1+B*D[x])^c \quad \text{(Eq. 1)},$$

where x is the message position, D[x] is the diversity index at position x, and A(>0), B(>0), and c are scaling factors. Note that for c>0, the weighting W[x] decreases with increased diversity, and for c<0, the weighting W[x] increases with increased diversity. FIG. 10 illustrates example positional weights, by byte position, calculated from the example richness diversity index of FIG. 9, using the weighting function:

$$W[x]=2/(1+D[x]) \quad \text{(Eq. 2)}.$$

It will be noted that embodiments of present disclosure are not limited to a particular weighting function, and that other weighting functions may be used by the weighting calculation module 345. For example:

the weighting function may be exponential, e.g.:

$$W[x]=A*e^{\wedge}(-k*D[x]) \quad \text{(Eq. 3)}.$$

where A and k are constants;

the weighting function may be a function of byte position only (i.e., independent of the diversity score), e.g.:

$$W[x]=A/(1+B*x)^c \quad \text{(Eq. 4)}.$$

a threshold range may be applied to the diversity score, such that only byte positions within the threshold range are considered, and all other byte positions are given a zero weight, e.g.:

$$W[x]=(1,\text{if } D[x]>=D\_\min \&\& D[x]<=D\_\max \quad \text{(Eq. 5)}.$$

(0, otherwise, where W[x] is the weighting at position x, D[x] is the diversity at position x, D_min is the minimum diversity threshold, and D_max is the maximum diversity threshold; and/or the weighting may be hierarchical, e.g., similarities/distances are first computed for byte positions with a low diversity (for example, within a certain threshold range), where similarities for other (e.g., higher diversity) byte positions may only be considered when needed (e.g., as a "tie-breaker").

The distance function module 350 measures the similarity of two messages, based on the diversity-based weights determined by the weighting calculation module 345. For example, the module 350 may be configured to implement the Needleman-Wunsch algorithm in measuring the similarity of the received request to each of the messages stored in the transaction library 330 based on the respective weightings of the sections thereof; however, other distance functions may also be used. In some embodiments, the positional weights calculated by the weighting calculation module 345 may be one dimensional, while each of the two messages being compared (that is, the received request and each of the stored requests) may have their own position indices. As such, the distance function module 350 may project the position indices of the messages being compared onto the diversity-based positional weights, for example, using the function:

$$i\_w=\max(i1,i2) \quad \text{(Eq. 6)},$$

where i1 is the index of the character (or byte) being compared from message 1, i2 is the index of the character (or byte) being compared from message 2, and i_w is the positional weights index. The response generation module 355 may thereby generate a response to the received request based on a stored response associated with the closest matching one of the stored requests, as identified based on the respective weightings of the sections thereof.

Although FIG. 3 illustrates example hardware/software architectures that may be used in a device, such as the computing device 200 of FIG. 2, to provide opaque entropy-weighted service emulation in accordance with some embodiments described herein, it will be understood that the present invention is not limited to such a configuration but is intended to encompass any configuration capable of carrying out operations described herein. Moreover, the functionality of the computing device 200 of FIG. 2 and the hardware/software architecture of FIG. 3 may be implemented as a single processor system, a multi-processor system, a processing system with one or more cores, a distributed processing system, or even a network of stand-alone computer systems, in accordance with various embodiments.

Computer program code for carrying out the operations described above and/or illustrated in FIGS. 1-3 may be written in a high-level programming language, such as COBOL, Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 4:
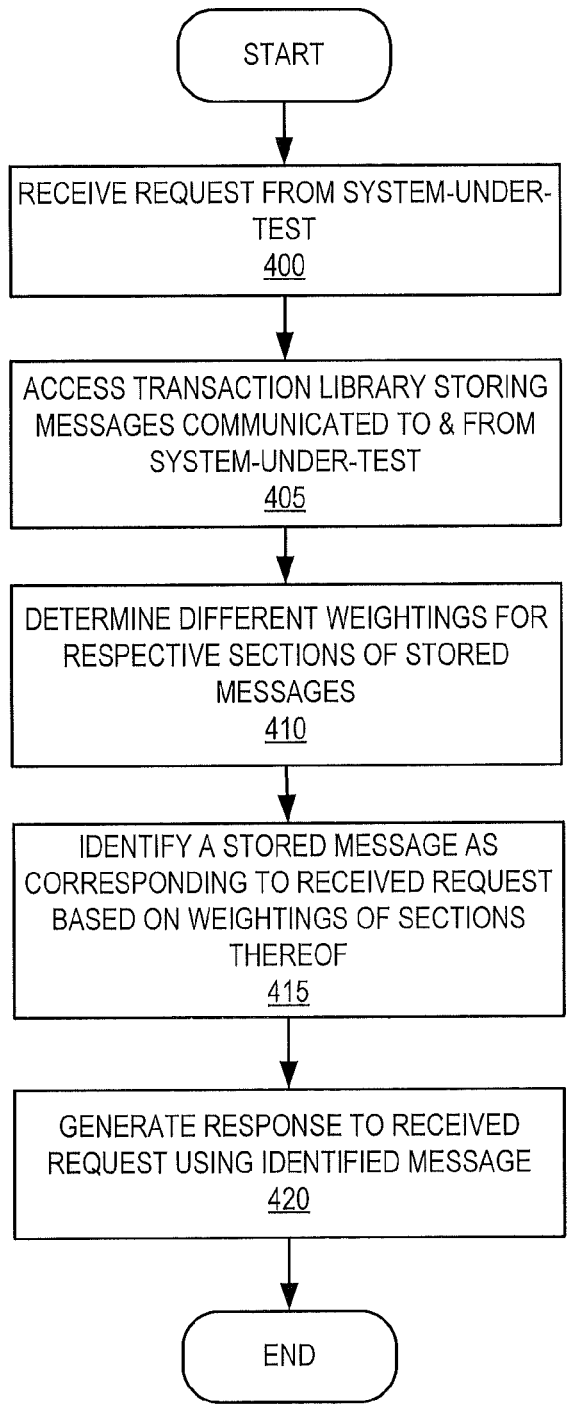
FIGS. 4-5 are flowcharts illustrating methods for service emulation in accordance with some embodiments of the present disclosure.
Figure 5:
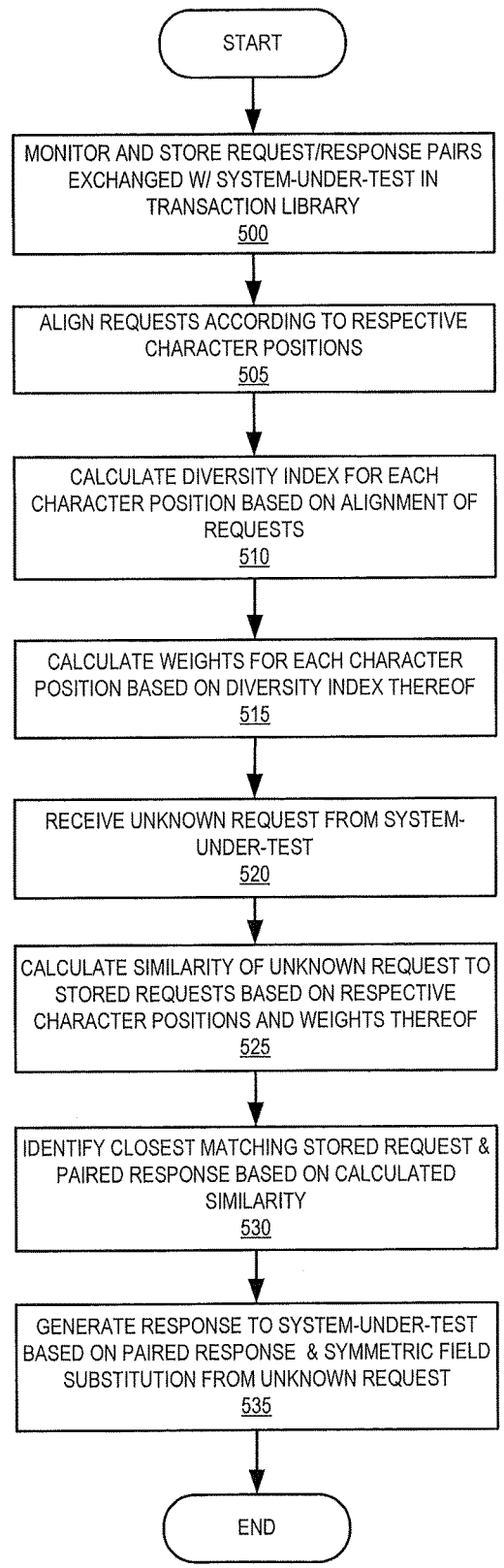

Operations for providing opaque service emulation in accordance with some embodiments of the present disclosure will now be described with reference to the flowcharts of FIGS. 4 and 5. FIGS. 4 and 5 illustrate operations that may be performed by a virtual service environment (such as the environment 115 of FIG. 1) to emulate the behavior of a target system for virtualization (such as the environment 110 of FIG. 1) in response to a request from the system under test (such as the system under test 105 of FIG. 1).

Referring now to FIG. 4, operations begin at block 400 where a request is received from a system under test. The request may be transmitted from the system under test to request a service on which the system under test depends, such as that provided by one or more of the endpoints 111A-111N of the deployment environment 110 of FIG. 1. For example, the received request may be in the form of an LDAP or a SOAP message. At block 405, a transaction library is accessed responsive to receiving a request at block 400. The transaction library stores messages (including requests and associated responses) that have been previously communicated with (i.e., to and/or from) the system under test. Different weightings are determined for respective sections, fields, positions and/or other portions of the messages stored in the transaction library at block 410. The different weightings may be based on a relative variability or entropy of respective sections (including fields and/or character positions) among the messages stored in the transaction library. For example, the relative variability of the respective sections may be determined based on a byte-by-byte comparison of respective character positions in each section with corresponding sections of each message stored in the library. The different weightings may thus be based on a diversity of characters in each section/field/character position, and may be independent of an amount or quantity of characters (i.e., a "length") of the respective sections of the messages.

Based on the weightings of the sections of the stored messages, one of the stored messages is identified as corresponding to the received request at block 415. For example, a similarity of the received request to each of the respective requests stored in the transaction library may be determined using a distance function that is weighted based on the different weightings of the sections thereof (e.g., a position weighted distance function), and a closest matching one of the stored requests may be identified. Using the identified one of the stored messages, a response to the received request is generated at block 420. For example, a stored response associated with the closest matching one of the stored requests may be used to generate the response, based on a similarity of a message structure thereof.

FIG. 5 illustrates operations for providing opaque service emulation in accordance with some embodiments of the present disclosure in greater detail, with reference to the alignment methods of FIGS. 6-7 and the graphs of FIGS. 8-10. Referring now to FIG. 5, operations begin at block 500 by monitoring communication messages (including request/response pairs; also referred to as "transactions") exchanged between a system under test and one or more endpoints, and storing the request/response pairs in a transaction library. The endpoint(s) may correspond to a system upon which the system under test depends (that is, where the system under test is a client), such as the endpoints 111A-111N of the deployment environment 110 of FIG. 1.

The request/response pairs stored in the transaction library are used as historical data for generating a response to an incoming request from a system under test, by matching the incoming request to one of the stored requests, and generating the response based on the stored response associated with the matching one of the stored requests. However, as the accuracy of some distance matching functions may be disproportionally influenced by message sections having a greater amount of characters, sections of the stored messages are weighted differently, such that message sections of greater relevance in matching a request to a similar request (for example, header or operation type sections, which are typically shorter in length) are identified based on relative diversity and given greater weight in the distance calculation. As such, at block 505, the requests (of the request/response pairs) stored in the transaction library are aligned according to respective character positions thereof.

FIGS. 6 and 7 illustrate examples of aligning requests stored in the transaction library based on character position. In FIGS. 6 and 7, alignment of requests having up to 11 character positions are illustrated by way of example; however, alignment of requests having a greater number of characters (e.g., 250+ characters) are described in further examples below. In particular, FIG. 6 illustrates aligning messages by their respective byte or character indices 0-10, while FIG. 7 illustrates a more complex aligning of the requests using a multiple sequence alignment (MSA) algorithm (such as ClustalW) where common subsequences (the character 'Z' in FIG. 7) are aligned. However, embodiments of the present invention are not limited to these example alignments.

Still referring to FIG. 5, at block 510, a diversity index for each character position is calculated based on the alignment of the requests. For example, where the stored requests are aligned in columns by character position (as shown in FIGS. 6 and 7), a diversity of each character position may be calculated based on a byte-by-byte comparison of the characters in each column. Example diversity measures may include entropy measures (as shown in the graph of FIG. 8) and/or richness (as shown in the graph of FIG. 9).

In particular, FIG. 8 illustrates the Shannon Index calculated from a sample transaction library including stored requests having 250 or more characters, while FIG. 9 illustrates the richness diversity index for the same transaction library. As shown in FIGS. 8 and 9, greater stability/lesser diversity is found in earlier sections/character positions of the stored requests (that is, within the first 0-160 characters) than in a later character positions (that is, from characters 190-250). In particular, when the messages are aligned based on byte position, there is significantly more variability in byte positions from about 190 to 250, while there is relatively little variability in positions from about 0 to 160, and slightly more variability in positions from about 175 to 185. From this relative variability, it can be deduced or inferred that positions 190 to 250 may correspond to the record fields of the stored requests, positions 0 to 160 may correspond to the header fields of the stored requests, and positions 175 to 185 may correspond to the operation-type fields of the stored request. These message sections/fields (or byte positions) may thereby be identified and weighted based on their relative importance to identification of a closest matching request/response pair in the transaction library 130/230/330. However, it will be understood that the diversity index for each section or character position is not limited to these example calculations, and may be calculated using the other diversity or entropy measures, such as the Gini index.

As such, referring again to FIG. 5, weights for each character position are calculated based on the diversely index thereof at block 515. FIG. 10 is a graph illustrating weighting, by byte position, in accordance with some embodiments described herein. As shown in FIG. 10, message positions having lower diversity or variability among the requests stored in the transaction library are assigned greater weightings. In particular, in the example of FIG. 10, the first 160 or so character positions are assigned weightings of 1 (with the exception of about 3 positions), while character positions after position 160 are assigned weightings of less than 1. Thus, the weights for each character position are calculated at block 515 by applying the weighting function in proportion to the inverse of the diversity index of the respective character positions.

At block 520, an unknown request is received from a system under test. The unknown request may be directed to an endpoint and/or environment for which service emulation is desired, such as the deployment environment 110 of FIG. 1. Responsive to receiving the unknown request, a similarity of the unknown request to the requests stored in the transaction library is calculated based on the character positions and weights thereof at block 525. For example, a distance function may be used to measure the similarity of the unknown request to ones of the stored requests, based on the weights calculated for each character position at block 515. An example distance function, as noted above, is the Needleman-Wunsch function. As such, a closest matching one of the stored requests and a associated response thereto is identified based on the calculated similarity at block 530, and a response to the system under test is thereby generated based on the stored response paired with the closest matching one of the stored requests at block 535. In particular, as described above, symmetric field substitution from the unknown request is used with the matching one of the responses to generate a response to the unknown request.

Thus, embodiments of the present disclosure provide a system that is configured to automatically build executable interactive models of software service behavior from recorded message transactions, without prior knowledge of the internals of the service and/or of the protocols the service uses to communicate, which can reduce human effort in manually specifying models, as well as reduce reliance on system experts and/or the need for extensive documentation of the service protocol and behavior. Models may be built directly from interaction traces previously recorded between a system under test and a software service upon which the system under test depends, by using the interaction traces as a library with which to compare new, unknown requests received from a system under test. A distance function, such as the Needleman-Wunsch longest common subsequence alignment method, may be used to calculate the distances/similarities between an unknown request from a system under test and previous requests among the stored interaction traces. In some embodiments, the response associated with the closest matching request is identified as the most relevant response to use in synthesis of a response to a system under test, where symmetric field substitution is used to modify the identified response so that it is tailored to the unknown request.

Further embodiments are directed to an extension of opaque response matching for service emulation/virtualization, based on realization that some fields in the incoming request (such as the operation name) are more relevant in identifying a stored request/response for generation of a response to the system under test. As such, during request/response matching, different parts of the message are identified and weighted according to their relative importance to response generation, for example, as a function of their global entropy or diversity as measured among the messages stored in the transaction library. Accordingly, embodiments of the present disclosure may increase the accuracy of opaque response matching for service emulation/virtualization, by implicitly differentiating between header bytes, operation types and record data based on respective weightings assigned thereto. Although no explicit message structure information is used, entropy or diversity measurements are used as a proxy to weight different parts of the message differently, during the matching process. Further embodiments may use clustering to group responses and requests, and then infer relevant or critical junctures at which different types of responses are sent for similar looking requests. Utilizing conversation state information may also improve the accuracy of synthesized responses.

Specific examples discussed below provide results of the Needleman-Wunsch longest common subsequence distance measure combined with symmetric field substitution in opaque response generation for two message protocols (LDAP and SOAP). In the below examples, for LDAP, 94% of synthesized responses were identical to that of the real service, and 98% of generated responses were protocol conformant. For the more complex-structured SOAP, while only 9% of synthesized responses were identical, 100% were protocol conformant.

In particular, for evaluation purposes, two protocols were used where the precise message structures (as well as the corresponding temporal properties) are known: the Simple Object Access Protocol (SOAP) and the Lightweight Directory Access Protocol (LDAP). SOAP is a light-weight protocol designed for exchanging structured information typically in a decentralized, distributed environments, whereas LDAP may be widely used in large enterprises for maintaining and managing directory information. The interaction trace for SOAP used for evaluation was generated based on a recording of a banking example using the LISA® tool. The protocol included 7 different request types, each with a varying number of parameters, encoding typical transactions from a banking service. From a predefined set of account identifiers, account names, etc., an interaction trace containing 1,000 request/response pairs was generated. Amongst those, there were 548 unique requests (with only 22 requests occurring multiple times), 714 unique responses (the replicated ones predominantly due to the fact that the deleteToken-Response message only had true or false as possible return values), and 23 duplicated request/response pairs. For purposes of evaluation, this was considered a sufficiently diverse population of messages to work with.

The following is one of the recorded requests:

```
<?xml version="1.0"? >
  <S:Envelope
    xmlns:S="http://schemas.xmlsoap.org/soap/envelope/">
    <S:Body>
      <ns2:getAccount xmlns:ns2="http://bank/">
        <accountId>867-957-31</accountId></ns2:getAccount>
    </S:Body>
  </S:Envelope>
``` with the following the corresponding response:

```
<?xml version="1.0"?>
  <S:Envelope
    xmlns:S="http://schemas.xmlsoap.org/soap/envelope/">
    <S:Body>
      <ns2:getAccountResponse xmlns:ns2="http://bank/">
        <return>
          <accountId>867-957-31</accountId>
          <fname>Steve</fname>
          <lname>Hine</lname>
        </return>
      </ns2:getAccountResponse>
    </S:Body>
  </S :Envelope>
```

This example illustrates that besides the structural SOAP information encoded in both messages, there may be specific information that appears in both the SOAP request and SOAP response, such as the account-ID in the example above. LDAP is a binary protocol that uses an ASN.1 encoding to encode and decode text-based message information to and from its binary representation, respectively. A corresponding decoder was used in order to translate recorded LDAP messages into a text format and an encoder was used to check whether the synthesized responses were well-formed. In some embodiments, however, the encoding/decoding steps may be omitted and the corresponding binary representations may be directly manipulated.

The LDAP interaction trace used for the evaluation included 498 unique interactions containing some core LDAP operations, such as adding, searching, modifying etc. applied a sample directory. The trace did not contain duplicated requests or responses, and the search responses contained a varying number of matching entries, ranging from zero to 12.

The following briefly illustrates the textual representation of a search request:
  Message ID: 15
  ProtocolOp: searchRequest
  ObjectName: cn=Juliet LEVY, ou=Administration,
    ou=Corporate, a=DEMOCORP, c=AU
  Scope: 0 (baseObject),
and the associated response, including the merge of a search result entry and a search result done message:
  Message ID: 15
  ProtocolOp: searchResEntry
  ObjectName: en=Juliet LEVY, ou=Administration,
    ou=Corporate, o=DEMOCORP, c=AU
  Scope: 0 (baseObject)
  Message ID: 15
  ProtocolOp: searchResDone
  resultCode: success This example LDAP request contains a (unique) message identifier (Message ID: 15) and a specific object name (ObjectName: . . . ) as the root node for the search to be used. The associated responses use the same message identifier (to indicate the request they are in response to) and the searchResEntry message refers to the same object name as the request. To synthesize correct LDAP responses, the corresponding information can be copied across from the incoming request to the most similar response to be modified.

Figure 11:
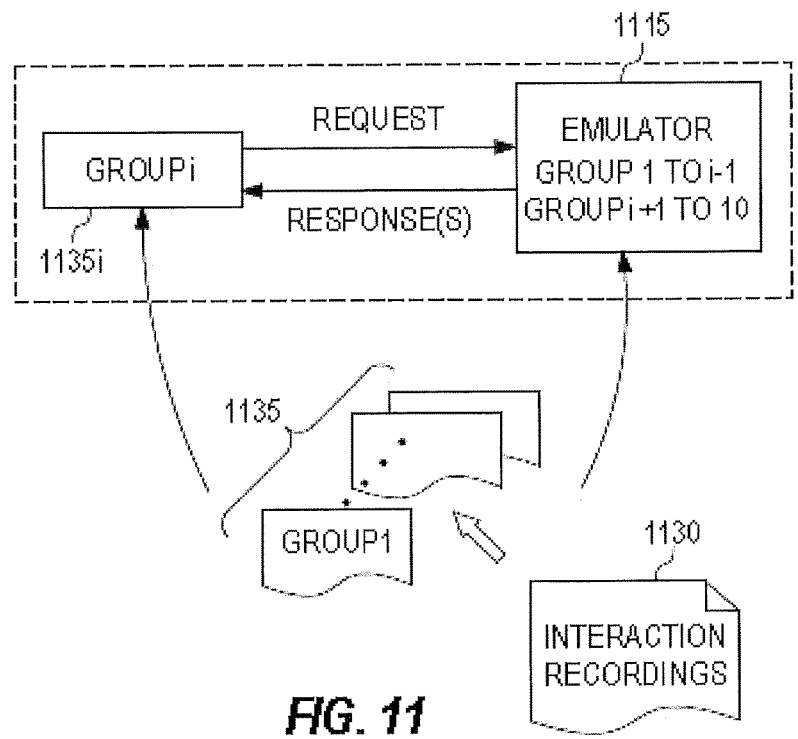
FIG. 11 is a block diagram illustrating a cross-validation approach for service emulation in accordance with some embodiments of the present disclosure.

A cross-validation approach is one method for assessing how the results of a statistical analysis may be generalized to an independent data set. For evaluation purposes, a 10-fold cross-validation approach was used for the recorded SOAP messages and the recorded LDAP messages. As shown in FIG. 11, a recorded data set 1130 was randomly partitioned into 10 groups 1135. Of the 10 groups, Group i 1135*i* is considered to be the evaluation group, and the remaining 9 groups define the training set. The cross-validation process was repeated 10 times (the same as the number of groups), so that each of the 10 groups 1130 was used as the evaluation group 1135*i* once. For each message in the evaluation group 1135*i*, the resulting response generated by the emulator 1115 was compared with the associated recorded response. The following criteria were used to evaluate the validity of synthesized responses:
  1. Identical: the synthesized response is identical to the recorded response if all characters in the synthesized response exactly match those in the recorded response.
  2. Well-Formed: the synthesized responses correspond to the structure required for responses as defined by the underlying protocol. Synthesized responses that do not meet these criteria were considered to be Ill-Formed.
  3. Protocol Conformant: the synthesized responses are well-formed and also conform to the temporal interaction properties of the given protocol, i.e., the temporal consistency between request and response is preserved.

For purposes of evaluation, a synthesized response is considered to be protocol conformant if it conforms to the temporal properties at some point in time, as the order in which the requests are selected from the evaluation set may be random (and thus unlikely to conform to a sequence of protocol conformant requests). If a synthesized response is identical, then the other two properties (well-formed and protocol conformant) are implied, under the assumption that the recorded interaction traces are considered to be valid and conform to the temporal interaction properties of the protocol. However, it may still be possible for the response generation process to synthesize a well-formed response that is not protocol conformant. For the purpose of emulation, protocol conformance may be an important property of a synthesized response. An aim of an emulatable endpoint model is not necessarily to reproduce the behavior of an actual endpoint to 100%; rather, responses provided by an emulated endpoint are substantially similar to that which would be provided by the actual endpoint should be sufficient for many quality assurance activities.

A random selection strategy was used to as a baseline to benchmark the effectiveness of synthesizing responses in accordance with some embodiments of the present invention described herein where, for an incoming request from a system under test, the response was randomly selected from the responses contained in the training set.

Based on the recorded SOAP messages, the common subsequence alignment (CSA) approach for response generation used by some embodiments of the present disclosure outperformed the random selection strategy in a number of aspects. Specifically, (i) all 1,000 synthesized responses using the CSA approach were protocol conformant, compared to only 33 of the randomly selected responses, and (ii) 9.3% of the generated responses were identical to the recorded responses in our approach, compared to 3.3% in the random selection strategy. With respect to the non-identical responses, the worst dissimilarity ratio of the common subsequence alignment approach was 0.046 (all other dissimilarity ratios are smaller). With an average response length of 239 characters, a maximum edit distance of 24 between the synthesized response and the expected response (i.e. the response associated with the most similar request) was achieved. This shows that, for the SOAP case study used, embodiments of the present disclosure were able to synthesize responses significantly more accurately than the random strategy.

Based on the recorded LDAP messages, for the common subsequence alignment approach, 466 (out of 498) generated response messages were identical to the associated recorded responses (89.9%), and an additional 18 of the generated responses met the protocol conformant criterion (3.6%). Therefore, a total of 487 (or 97.8%) of all generated responses were considered to be valid. Of the remaining 14 responses, 9 were well-formed, but had the wrong message type, and 5 responses were ill-formed, both of which are discussed in greater detail below.

As shown by the SOAP and LDAP experimental results discussed above, embodiments of the present disclosure may be able to automatically generate valid responses in many situations. However, as illustrated in the results for LDAP, a small proportion of protocol non-conformant or even ill-formed responses were synthesized. In order to better illustrate some underlying reasons, consider the following example where a protocol non-conformant response was synthesized. The following request:
    Message ID: 171
    ProtocolOp: addRequest
    ObjectName: cn=Miao DU, ou=Finance,
        ou=Corporate, o=DEMOCORP, c=AU
    Scope: 0 (baseObject)
resulted in the generation of the following response:
    Message ID: 171
    ProtocolOp: modifyResponse
    resultCode: success
The response is well-formed and the Message Id field has been substituted properly. However, according to the LDAP protocol specification, an addRequest (adding an extra node to an LDAP directory) should result in an addResponse, rather than in a modifyResponse as generated in the example above. One reason for the generation of this response may be attributed to the fact that the test set contains a modifyRequest with the same ObjectName and Scope as the addRequest above, and a Message ID of 151. The distance measure thus identified this modifyRequest as the most similar match and hence, the associated modifyResponse was used as the basis for the synthesized response. Many application-level protocols may define message structures containing some form of operation or service name in their requests, followed by a payload on what data this service is expected to operate upon. In the example above, the fact that addRequest and modifyRequest denote different operations was not taken into consideration when the most similar request was chosen.

Accordingly, further embodiments may allow for (semi-) automatic identification of which part(s) of a request message most likely correspond to a service name, use of this information to divide the set of interaction traces into clusters containing a single service type only, and restriction of the search for the most similar request to one cluster only. Such an approach should also improve run-time performance.

The following example indicates an ill-formed LDAP response. It should be noted that the Message Id and ObjectName fields have been properly substituted from the associated request. However, the protocolOp values of addResEntry and addResDone are invalid LDAP operation names and were tagged as such by the LDAP encoder used:
    Message ID: 154
    ProtocolOp: addResEntry
    ObjectName: cn=Miao DU, ou=Legal,
        ou=Corporate, o=DEMOCORP, c=AU
    Scope: 0 (baseObject)
    Message ID: 154
    ProtocolOp: addResDone
    resultCode: success
Similar to the previous example, there is a mismatch in the operation name of the most similar request: whereas the request message denotes an addRequest, the test set contained a searchRequest with a very similar message id and an identical ObjectName. The message id was substituted correctly, but all occurrences of "search" in the response were substituted to "add," resulting in an ill-formed LDAP response. As such, clustering the set of interactions according to the service/operation name may be used to prevent the selection of a searchRequest as the most similar request to an addRequest in the above example.

Comparing the dissimilarity measures of the LDAP and SOAP results, it appears that non-zero SOAP similarities may generally be significantly lower than the non-zero LDAP results, indicating that the non-exact matching SOAP responses are typically less dissimilar to the real or actual responses than their LDAP counterparts. This can be attributed to the fact that SOAP messages may contain a significant amount of structural information that can be duplicated in the generated responses. This makes the generated and real SOAP responses more similar, even when there are perhaps significant differences in the payload.

As such, determining the effectiveness of various distance and translation functions across protocols may require careful comparison, as low(er) dissimilarity ratios in one protocol may be due more to the amount of common structural information than the properties of the distance and/or translation functions used. Accordingly, some embodiments of the present disclosure may use heuristics to automatically or semi-automatically separate payload and structure in messages and devise similarity measures that give payload information a higher weighting than structural information in order to improve the cross-protocol comparisons.

Examples described herein have examined opaque response generation (that is, without pre-existing knowledge of the message structure) for text-based messages, with SOAP being a text-based protocol, and LDAP being a text representation. Further embodiments may allow for synthesis or generation of responses directly for binary protocols by allowing for automatic identification of fields, such as packet length, as binary packets often contain the packet length as part of the encoding.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of service emulation, the method comprising:
receiving a request from a system under test;
accessing a transaction library storing a plurality of messages communicated between the system under test and a target system for emulation, responsive to receiving the request;
assigning different weightings to respective sections of the messages stored in the transaction library based on relative variability of data included in the respective sections indicated by comparison thereof among the messages stored in the transaction library;
identifying one of the messages stored in the transaction library as corresponding to the request based on the different weightings assigned to respective sections of the messages, wherein the different weightings indicate relative importance of the respective sections of the messages to generation of a response to the request; and
generating the response to the request using the one of the messages that was identified,
wherein the respective sections of the messages comprise respective character positions, and further comprising:
determining the relative variability based on a relative diversity of characters in corresponding ones of the respective character positions among the messages stored in the transaction library, wherein determining the relative variability comprises:
aligning the messages according to the corresponding ones of the respective character positions; and
calculating a diversity index for each of the respective character positions based on the relative diversity of the characters in the corresponding ones of the respective character positions according to the aligning,
wherein the receiving, the accessing, the assigning, the identifying, the generating comprise operations performed by a processor.

2. A method of service emulation, the method comprising:
receiving a request from a system under test;
accessing a transaction library storing a plurality of messages communicated between the system under test and a target system for emulation, responsive to receiving the request;
assigning different weightings to respective sections of the messages stored in the transaction library based on relative variability of data included in the respective sections indicated by comparison thereof among the messages stored in the transaction library, wherein the relative variability is indicative of respective information types contained in the respective sections of the messages, the respective information types comprising protocol information and payload information;
identifying one of the messages stored in the transaction library as corresponding to the request based on the different weightings assigned to respective sections of the messages, wherein the different weightings indicate relative importance of the respective information types contained in the respective sections of the messages to generation of a response to the request; and
generating the response to the request using the one of the messages that was identified,
wherein the respective sections of the messages comprise respective character positions, and further comprising:
determining the relative variability based on a relative diversity of characters in corresponding ones of the respective character positions among the messages stored in the transaction library,
wherein the receiving, the accessing, the assigning, the identifying, and the generating comprise operations performed by a processor.

3. The method of claim 2. wherein assigning comprises:
identifying the respective sections of the messages as containing the respective information types based on the relative variability thereof; and
determining the different weightings for the respective sections of the messages according to the respective information types contained therein, wherein the different weightings comprise respective numerical values.

4. The method of claim 3, wherein greater ones of the different weightings are assigned to ones of the respective sections having a lower relative variability.

5. The method of claim 4, wherein identifying the respective sections comprises:
identifying the ones of the respective sections having the lower relative variability as comprising header or operation type information.

6. The method of claim 2, wherein identifying comprises:
identifying the one of the messages stored in the transaction library as corresponding to the received request based on a distance measure therebetween, wherein the distance measure is weighted according to the different weightings assigned to the respective sections of the messages.

7. The method of claim 6, wherein the messages stored in the transaction library comprise respective requests and responses thereto communicated between the system under test and the target system upon which the system under test depends, and wherein identifying the one of the messages as corresponding to the received request comprises:
calculating a similarity of the received request to the respective requests stored in the transaction library based on respective edit distances therebetween, wherein the respective edit distances are weighted according to the different weightings of the sections of the respective requests; and
identifying one of the respective requests stored in the transaction library based on the similarity of the received request thereto.

8. The method of claim 7, wherein generating the response comprises:
generating the response from one of the respective responses stored in the transaction library that is associated with the one of the respective requests that was identified.

9. The method of claim 8, wherein generating the response further comprises:
identifying respective fields in the one of the respective requests and in the associated one of the respective responses stored in the transaction library as comprising a common subsequence; and
populating a field in the response with a subsequence from the received request based on the respective fields that were identified.

10. The method of claim 2, wherein the different weightings are assigned independent of a character length of the respective sections of the messages stored in the transaction library.

11. A computer system, comprising:
a processor; and
a memory coupled to the processor, the memory comprising computer readable program code embodied therein that, when executed by the processor, causes the processor to:
access a transaction library storing a plurality of messages communicated between a system under test and a target system for emulation responsive to receiving a request from the system under test;
assign different weightings to respective sections of the messages stored in the transaction library based on relative variability of data included in the respective sections indicated by comparison thereof among the messages stored in the transaction library, wherein the relative variability is indicative of respective information types contained in the respective sections of the messages, the respective information types comprising protocol information and payload information;
identify one of the messages stored in the transaction library as corresponding to the received request based on the different weightings assigned to respective sections of the messages, wherein the different weightings indicate relative importance of the respective information types contained in the respective sections of the messages to generation of a response to the request; and
generate the response to the request using the one of the messages that was identified,
wherein the respective sections of the messages comprise respective character positions, and wherein the computer readable program code, when executed by the processor, further causes the processor to:
determine the relative variability based on a relative diversity of characters in corresponding ones of the respective character positions among the messages stored in the transaction library.

12. The computer system of claim 11, wherein the computer readable program code further causes the processor to:
identify the respective sections of the messages as containing the respective information types based on the relative variability thereof; and
determine the different weightings for the respective sections of the messages according to the respective information types contained therein, wherein the different weightings comprise respective numerical values.

13. The computer system of claim 12, wherein greater ones of the different weightings are assigned to ones of the respective sections having a lower relative variability.

14. The computer system of claim 11, wherein the computer readable program code further causes the processor to identify one of the messages stored in the transaction library as corresponding to the received request based on a distance measure therebetween, wherein the distance measure is weighted according to the different weightings assigned to the respective sections of the messages.

15. The computer system of claim 14, wherein the messages stored in the transaction library comprise respective requests and responses thereto communicated between the system under test and the target system upon which the system under test depends, and wherein the computer readable program code further causes the processor to
calculate a similarity of the received request to the respective requests stored in the transaction library based on respective edit distances therebetween, wherein the respective edit distances are weighted according to the different weightings of the sections of the respective requests;
identify one of the respective requests stored in the transaction library based on the similarity of the received request; and
generate the response from one of the respective responses stored in the transaction library that is associated with the one of the respective requests that was identified.

16. A computer program product comprising:
a non-transitory computer readable storage medium having computer readable program code embodied in the medium, the computer readable program code comprising:
computer readable code to access a transaction library storing a plurality of messages communicated between a system under test and a target system for emulation responsive to receiving a request from the system under test;

computer readable code to assign different weightings to respective sections of the messages stored in the transaction library based on relative variability of data included in the respective sections indicated by comparison thereof among the messages stored in the transaction library, wherein the relative variability is indicative of respective information types contained in the respective sections of the messages, the respective information types comprising protocol information and payload information;

computer readable code to identify one of the messages stored in the transaction library as corresponding to the received request based on different weightings assigned to respective sections of the messages, wherein the different weightings indicate relative importance of the respective information types contained in the respective sections of the messages to generation of a response to the request; and computer readable code to generate the response to the request using the one of the messages that was identified, wherein the respective sections of the messages comprise respective character positions, and wherein the computer readable program code further comprises:

computer readable code to determine the relative variability based on a relative diversity of characters in corresponding ones of the respective character positions among the messages stored in the transaction library.

* * * * *